United States Patent
Kirihara et al.

(10) Patent No.: US 7,054,142 B2
(45) Date of Patent: May 30, 2006

(54) NIOBIUM ALLOY POWDER, ANODE FOR SOLID ELECTROLYTIC CAPACITOR AND SOLID ELECTROLYTIC CAPACITOR

(75) Inventors: Tadasu Kirihara, Chiba (JP); Nobuyuki Sato, Chiba (JP); Osamu Ebato, Chiba (JP); Kan Saito, Chiba (JP)

(73) Assignee: JFE Mineral Company, Ltd. (JP)

( * ) Notice: Subject to any disclaimer, the term of this patent is extended or adjusted under 35 U.S.C. 154(b) by 0 days.

(21) Appl. No.: 10/523,448

(22) PCT Filed: Aug. 8, 2003

(86) PCT No.: PCT/JP03/10126

§ 371 (c)(1),
(2), (4) Date: Jan. 31, 2005

(87) PCT Pub. No.: WO2004/016374

PCT Pub. Date: Feb. 26, 2004

(65) Prior Publication Data

US 2005/0280977 A1 Dec. 22, 2005

(30) Foreign Application Priority Data

Aug. 13, 2002 (JP) .............................. 2002-235820

(51) Int. Cl.
*H01G 9/00* (2006.01)
(52) U.S. Cl. ...................... 361/528; 361/523; 361/525; 361/529; 361/530; 29/25.03
(58) Field of Classification Search ................ 361/523, 361/525, 528, 529, 530; 29/25.03; 75/244, 75/255, 229
See application file for complete search history.

(56) References Cited

U.S. PATENT DOCUMENTS

| 3,825,802 A | 7/1974 | Kumagni et al. |
| 4,544,403 A | 10/1985 | Schiele et al. |

(Continued)

FOREIGN PATENT DOCUMENTS

| JP | 2002-134367 A | 5/2002 |
| WO | WO 91/19015 A1 | 12/1991 |

(Continued)

*Primary Examiner*—Nguyen T. Ha
(74) *Attorney, Agent, or Firm*—DLA Piper Rudnick Gray Cary US LLP

(57) ABSTRACT

There is provided a niobium alloy powder suitable for manufacturing solid electrolytic capacitors having small leakage currents and high capacitances, where the powder is obtained by enhancing the thermal stability of the niobium oxide coating film while improving the temperature dependence of the sintering behavior of the powder. The niobium alloy powder includes one or more of molybdenum, chromium, and tungsten each with a content of 0.002 to 20% by mass, and phosphorus and boron each with a content of 0.002 to 5% by mass, and moreover, includes hydrogen with a content of 0.005 to 0.10% by mass, the balance being substantially niobium; the specific surface area of the powder is from 1 to 20 m$^2$/g; the powder has a cumulative pore volume of 0.2 ml/g or more; and the cumulative volume of the pores each having a diameter of 1 μm or less makes up 10% or more and the cumulative volume of the pores each having a diameter of 10 μm or less makes up 40% or more in relation to the total cumulative pore volume.

10 Claims, 1 Drawing Sheet

U.S. PATENT DOCUMENTS

| | | | |
|---|---|---|---|
| 5,448,447 A * | 9/1995 | Chang | 361/529 |
| 6,592,740 B1 * | 7/2003 | Fife | 205/149 |
| 6,679,934 B1 * | 1/2004 | Rao et al. | 75/245 |
| 6,702,869 B1 * | 3/2004 | Habecker et al. | 75/229 |

FOREIGN PATENT DOCUMENTS

| | | |
|---|---|---|
| WO | WO 01/91953 A1 | 12/2001 |
| WO | WO 02/15208 A1 | 2/2002 |

* cited by examiner

NIOBIUM ALLOY POWDER, ANODE FOR SOLID ELECTROLYTIC CAPACITOR AND SOLID ELECTROLYTIC CAPACITOR

TECHNICAL FIELD

The present invention relates to a niobium alloy powder, an anode, formed by using the powder, for use in a solid electrolytic capacitor and a solid electrolytic capacitor formed by using the powder.

BACKGROUND ART

Although tantalum powder has hitherto been used for anodes of electrolytic capacitors, there has been a problem that tantalum is small in production and the supply price of tantalum is unstable. In these years, a trend of using niobium, abundant in amount of deposit and low in supply price, for anodes of electrolytic capacitors has been accelerated.

If the particle size of a niobium powder to be used as a material for an anode is made small for the purpose of manufacturing an electrolytic capacitor large in electrostatic capacitance, the sintering behavior in manufacturing a niobium sintered body is varied. More specifically, the temperature dependence of the shrinkage in sintering becomes large, and simultaneously the pores in the sintered body become small. Consequently, when capacitors are manufactured, deviations in electrostatic capacitance of the products are caused by the temperature distribution in a heating furnace, and filling of a conductive resin and the like to be used for cathodes become difficult. Accordingly, there are needed niobium powders small in particle size and small in the temperature dependence of the sintering behavior. Moreover, there is a problem that capacitors using niobium powders are generally larger in leakage current and larger in degradation of properties at high temperatures than capacitors using tantalum powders.

There are solid electrolytic capacitors made of valve metal powders composed of tantalum added with nitrogen, silicon, phosphorus, boron and the like (see for example, Patent Document 1). Additionally, there is a technique in which the sintering speed is suppressed by doping tantalum with phosphorus, sulfur, silicon, boron, nitrogen and the like (see for example, Patent Document 2).

In these techniques, the particles of the objective powders are relatively large, and hence these techniques cannot be applied as they are to niobium powders small in particle size to attain high electrostatic capacitance.

[Patent Document 1] U.S. Pat. No. 3,825,802 (column 2, lines 13 to 19)

[Patent Document 2] U.S. Pat. No. 4,544,403 (column 2, lines 51 to 61)

DISCLOSURE OF THE INVENTION

The present invention provides a niobium alloy powder which has solved the above described problems in niobium capacitors. An object of the present invention is the provision of a niobium alloy powder for manufacturing capacitors small in leakage current and high in electrostatic capacitance by improving the temperature dependence of the sintering behavior of the niobium alloy powder and by enhancing the thermal stability of the oxide coating film. Another object of the present invention is the provision of an anode for use in a solid electrolytic capacitor using the niobium alloy powder and a solid electrolytic capacitor using the niobium alloy powder.

The present invention is a niobium alloy powder, characterized in that the niobium alloy powder includes one or more selected from the group consisting of molybdenum: 0.002 to 20% by mass, chromium: 0.002 to 20% by mass, tungsten: 0.002 to 20% by mass, phosphorus: 0.002 to 5% by mass, and boron: 0.002 to 5% by mass; and moreover, hydrogen: 0.005 to 0.10% by mass; the balance being substantially niobium; wherein the specific surface area of the powder is from 1 to 20 $m^2/g$; the powder has a cumulative pore volume of 0.2 ml/g or more by mercury porosimetry; and the cumulative volume of the pores each having a diameter of 1 μm or less makes up 10% or more and the cumulative volume of the pores each having a diameter of 10 μm or less makes up 40% or more in relation to the total cumulative pore volume.

By containing one or more of molybdenum, chromium, and tungsten each with a content of 0.002 to 20% by mass and phosphorus and boron each with a content of 0.002 to 5% by mass, and by further containing hydrogen with a content of 0.005 to 0.10% by mass, the temperature dependence in sintering is improved and there is obtained a niobium alloy powder suitable for manufacturing solid electrolytic capacitors. Additionally, with a niobium alloy powder added with these elements, there is obtained an effect of lowering the leakage current value.

If the ranges of the molybdenum, chromium, tungsten, phosphorus and boron components depart from the above described lower limits, respectively, the effect of suppressing the temperature dependence in sintering cannot be obtained, while if the ranges of the components exceed the above described upper limits, respectively, the leakage current increases, and accordingly the performance of capacitors is degraded. Accordingly, the ranges of the respective components have been specified as described above. Additionally, a niobium alloy powder with the content of hydrogen controlled to an appropriate value improves the press moldability, makes the boundaries between the secondary particles disappear after pressing and inhibits the edge break of molded bodies. Accordingly, such a niobium alloy powder is preferable because it can improve the moldability as compared with a niobium alloy powder without added hydrogen.

The specific surface area of the powder is preferably from 1 to 20 $m^2/g$. When the specific surface area is less than 1 $m^2/g$, merely capacitors small in electrostatic capacitance can be manufactured, while when the specific surface area exceeds 20 $m^2/g$, the primary particles become too fine to ensure the withstand voltage required when used for capacitors. Accordingly, the specific surface area is limited as described above for the purpose of obtaining practical capacitors.

Additionally, there is a problem that when the pore volume is less than 0.2 ml/g, the cumulative pore volume of the pores of 1 μm or less is less than 10% in relation to the total cumulative pore volume, or the pore volume of the pores of 10 μm or less is less than 40% in relation to the total cumulative pore volume, sintering is made to proceed easily and the surface area of the sintered body becomes small, namely, the electrostatic capacitance of the capacitor becomes small. Moreover, there occurs a problem that as the sintering proceeds, the pores become further smaller, and hence a conductive resin and the like cannot be filled when a cathode of the capacitor is formed. The pore volume of the powder is measured by mercury porosimetry.

Further inclusion of 0.005 to 1% by mass of nitrogen in the above described niobium alloy powder can prevent the diffusion of the oxygen in the niobium oxide generated by the chemical conversion treatment, and hence the long term stability and the heat resistance are preferably improved.

Additionally, when the average particle size of the secondary particles which are formed by coagulation of the primary particles is from 10 to 200 μm, the above described niobium alloy powder can maintain the moldability even when the primary particles are fine particles.

According to the present invention, by regulating the specific surface area and the pore distribution of a niobium alloy powder to be used for solid electrolytic capacitors so as to fall within certain ranges, respectively, and by adding specific components, the temperature dependence in sintering solid electrolytic capacitors can be made small, and simultaneously the leakage current of the capacitors can be reduced. Accordingly, by use of the niobium alloy powder of the present invention, there can be fabricated an anode for use in a solid electrolytic capacitor high in electrostatic capacitance and small in leakage current and the solid electrolytic capacitor.

BEST MODE FOR CARRYING OUT THE INVENTION

Figure 1:
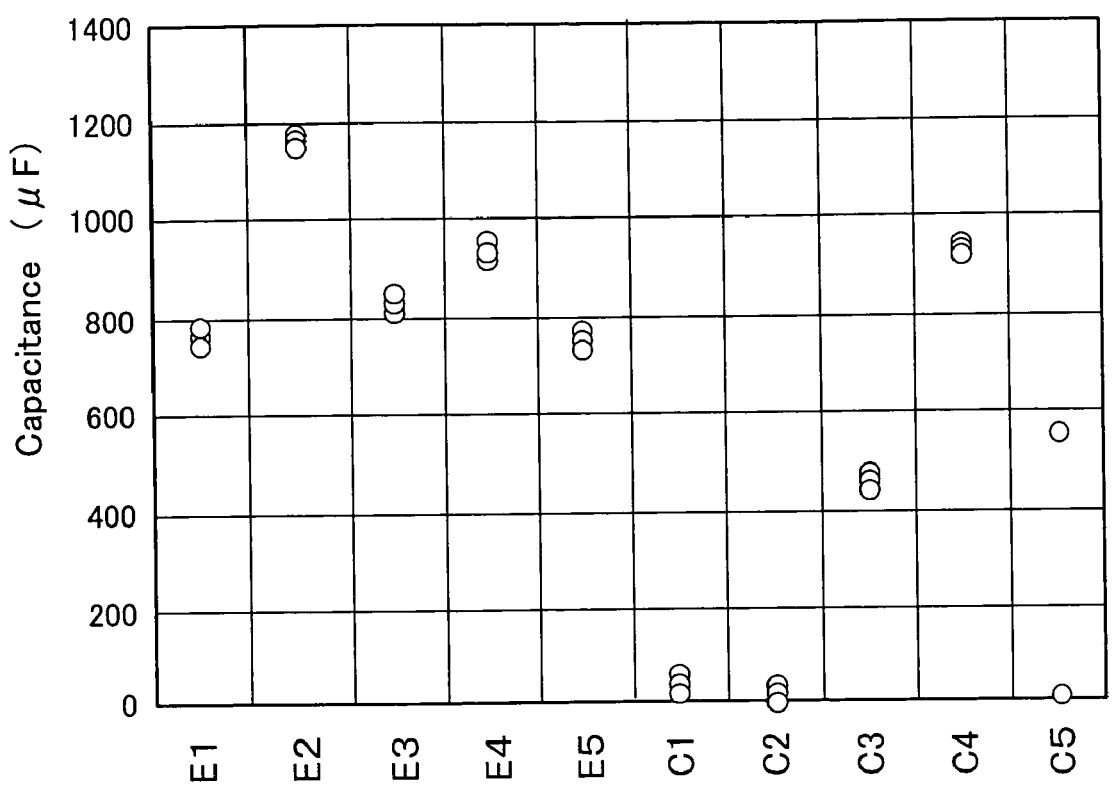
FIG. 1 is a graph showing the distribution of the measured electrostatic capacitance values of Examples and Comparative Examples.

The embodiments of the present invention will be described below.

The preparation of the niobium alloy powder of the present invention can be carried out with a CVD apparatus and the like. Compounds and the like of chromium, molybdenum, tungsten, phosphorus and boron were respectively, appropriately mixed as raw materials in niobium chloride, and the mixture thus obtained was reduced by use of hydrogen gas to prepare a niobium alloy powder.

The particle size and the pore size of the primary particles can be appropriately controlled so as to be appropriate sizes for providing the below described powder properties by controlling the residence time of the raw material, the temperature and the like in the reaction in a CVD apparatus and the subsequent heat treatment conditions. The specific surface area of the powder is set at 1 to 20 m²/g. When the specific surface area is smaller than 1 m²/g, merely capacitors small in capacitance can be manufactured, while when the specific surface area exceeds 20 m²/g, the primary particles become too fine to ensure the withstand voltage when used as capacitors.

Additionally, the cumulative pore volume is set at 0.2 ml/g or more, the cumulative pore volume of the pores each having a diameter of 1 μm or less is made to be 10% or more and the pore volume of the pores each having a diameter of 10 μm or less is made to be 40% or more in relation to the total cumulative pore volume. In this way, there can be prevented a problem that the electrostatic capacitance of the capacitors is made small by the fact that sintering proceeds too fast and hence the surface area becomes small, and a problem that a conductive resin and the like cannot be filled when the anodes of the capacitors are formed. The pore volume of the powder is measured by mercury porosimetry. For analysis of molybdenum, tungsten, chromium, phosphorus and boron, hydrofluoric acid and nitric acid or sulfuric acid are added, pyrolysis is carried out in water bath, and analysis is made on an ICP apparatus.

EXAMPLES

Specific examples of the present invention will be described below with reference to Examples.

Niobium pentachloride was used as a raw material for niobium, and a niobium alloy powder was prepared by hydrogen reduction. In so doing, chlorides of molybdenum, tungsten and the like were added to the raw material for niobium to regulate the components. Moreover, a heat treatment was carried out in an atmosphere of argon gas at 800 to 1000° C. to control the particle size and the pore volume of the powder. By use of this niobium powder, a pellet was formed and a solid electrolytic capacitor was fabricated on the basis of the following method.

A niobium wire of φ0.3 mm to be used as a cathode was embedded in a mass of 0.1 g of the niobium alloy powder and the mass was press molded to a bulk density of 3000 kg/m³ to form a pellet. The so formed pellet was sintered in an atmosphere having an internal pressure of the furnace of $1 \times 10^{-3}$ Pa, at 1100 to 1400° C. The sintered pellet was immersed in a 0.8% by mass aqueous solution of phosphoric acid and a voltage of 20 V was applied for 4 hours to form a chemical conversion coating film.

Thereafter, in a 40% by mass aqueous solution of sulfuric acid, the measurement of the electrostatic capacitance and the measurement of the leakage current of the niobium capacitor were carried out. The leakage current was measured as a value after application of a voltage of 14 V for 5 minutes, and the electrostatic capacitance was measured as a value at 120 Hz under a condition of an applied bias of 1.5 V. The results were evaluated in terms of the CV value. The results obtained are collectively shown in Table 1.

Moreover, the samples E-1 to E-5, and C-1 to C-5, subjected to a chemical conversion treatment as described above, each were filled with polypyrrole in the interior of the sintered body as the other electrode (cathode) material. Moreover, these samples each were laminated with a carbon paste and a silver paste and thereafter each were mounted in a lead frame, and then sealed with an epoxy resin to fabricate a capacitor. The electrostatic capacitance values of these capacitors were also measured as values at 120 Hz under a condition of an applied bias of 1.5 V. In FIG. 1, there is shown a distribution of the measured values of the electrostatic capacitance (μF) in Examples and Comparative Examples. In the figure, E-1 to E-5 denote Examples and C1 to C5 denote Comparative Examples.

TABLE 1

| | | Pore volume ml/g | Volume ratio of pores equal to or less than 1 μm % | Volume ratio of pores equal to or less than 10 μm % | Specific surface area of powder m²/g | Secondary particle size μ□ | Mo % by mass | Cr % by mass | W % by mass | P % by mass | B % by mass | N % by mass | H % by mass | Wet measurement*) CV value μF · V/g | Wet measurement*) leakage current μA/μF |
|---|---|---|---|---|---|---|---|---|---|---|---|---|---|---|---|
| E-1 | Example 1 | 0.53 | 17 | 42 | 4.5 | 35 | 5.23 | 0.001 | 0.001 | 0.001 | 0.001 | 0.02 | 0.035 | 158400 | 0.0023 |
| E-2 | Example 2 | 0.46 | 26 | 56 | 11.3 | 78 | 0.001 | 2.58 | 0.001 | 0.001 | 0.001 | 0.02 | 0.54 | 238000 | 0.0025 |

TABLE 1-continued

|  |  | Pore volume ml/g | Volume ratio of pores equal to or less than 1 μm % | Volume ratio of pores equal to or less than 10 μm % | Specific surface area of powder m²/g | Secondary particle size μ☐ | Mo % by mass | Cr % by mass | W % by mass | P % by mass | B % by mass | N % by mass | H % by mass | Wet measurement*) CV value μF · V/g | Wet measurement*) leakage current μA/μF |
|---|---|---|---|---|---|---|---|---|---|---|---|---|---|---|---|
| E-3 | Example 3 | 0.75 | 35 | 60 | 3.3 | 46 | 0.001 | 0.001 | 17.5 | 0.001 | 0.001 | 0.03 | 0.021 | 164000 | 0.0018 |
| E-4 | Example 4 | 0.81 | 24 | 46 | 6.5 | 172 | 0.002 | 0.001 | 0.001 | 0.33 | 0.001 | 0.052 | 0.035 | 186000 | 0.0034 |
| E-5 | Example 5 | 0.29 | 18 | 55 | 2.6 | 108 | 0.001 | 0.001 | 0.001 | 0.001 | 1.21 | 0.12 | 0.028 | 154000 | 0.0018 |
| C-1 | Comp. ex. 1 | 0.18 | 28 | 54 | 3.7 | 62 | 0.001 | 3.25 | 0.001 | 0.001 | 0.001 | 0.03 | 0.003 | 188000 | 0.0032 |
| C-2 | Comp. ex. 2 | 0.54 | 9 | 33 | 2.5 | 8 | 3.8 | 0.001 | 0.001 | 0.001 | 0.001 | 0.02 | 0.032 | 175000 | 0.0017 |
| C-3 | Comp. ex. 3 | 0.35 | 33 | 57 | 0.9 | 93 | 25.8 | 0.001 | 0.001 | 0.001 | 0.001 | 0.02 | 0.019 | 92000 | 0.0285 |
| C-4 | Comp. ex. 4 | 0.65 | 35 | 43 | 3.4 | 102 | 0.001 | 0.001 | 0.001 | 6.84 | 0.001 | 0.02 | 0.015 | 185000 | 0.0324 |
| C-5 | Comp. ex. 5 | 0.77 | 19 | 42 | 2.8 | 87 | 0.001 | 0.001 | 0.001 | 0.001 | 0.001 | 0.02 | 0.23 | 161000 | 0.0016 |

*)"Wet measurement" means the measurement in a 40% by mass aqueous solution of sulfuric acid.

The shrinkage calculated from the shape variation of the pellet between before and after sintering was improved by controlling the pore size. Moreover, when the contents of molybdenum, tungsten, chromium, phosphorus, and boron each fell within a predetermined range, the temperature dependence of the shrinkage became small, the electrostatic capacitance was large, and the leakage current was suppressed. When these elements were added in contents exceeding the predetermined ranges, the leakage current became large. Additionally, the electrostatic capacitance values of the capacitors fabricated by using these pellets were investigated, and thus, for the samples departing from the ranges of the present invention, the incidence rate of the samples insufficient in electrostatic capacitance was 50%. This is probably because the pores were fusion bonded or made smaller by shrinkage in sintering the pellets, and hence the filling of polypyrrole was not able to be carried out successfully.

The invention claimed is:

1. A niobium alloy powder characterized in that the niobium alloy powder comprises any one or more selected from the group consisting of:
   molybdenum: 0.002 to 20% by mass,
   chromium: 0.002 to 20% by mass,
   tungsten: 0.002 to 20% by mass,
   phosphorus: 0.002 to 5% by mass, and
   boron: 0.002 to 5% by mass, and
   the niobium alloy powder further comprises:
   hydrogen: 0.005 to 0.10% by mass,
   the balance being substantially niobium,
   wherein the specific surface area of the powder is from 1 to 20 m²/g; the powder has a cumulative pore volume of 0.2 ml/g or more by mercury porosimetry; and the cumulative volume of the pores each having a diameter of 1 μm or less makes up 10% or more and the cumulative volume of the pores each having a diameter of 10 μm or less makes up 40% or more in relation to the total cumulative pore volume.

2. The niobium alloy powder according to claim 1, characterized in that the niobium alloy powder further comprises:
   nitrogen: 0.005 to 1% by mass.

3. The niobium alloy powder according to claim 2, characterized in that the average particle size of the secondary particles of the powder, which are formed by coagulation, is from 10 to 200 μm.

4. An anode for use in a solid electrolytic capacitor, characterized in that the anode is a sintered body using, as a raw material of the body, the niobium alloy powder according to claim 2.

5. A solid electrolytic capacitor characterized in that the solid electrolytic capacitor is made by incorporating a sintered body, as an anode in the interior of the capacitor, wherein the sintered body is made from the niobium alloy powder according to claim 2.

6. The niobium alloy powder according to claim 1, characterized in that the average particle size of the secondary particles of the powder, which are formed by coagulation, is from 10 to 200 ™m.

7. An anode for use in a solid electrolytic capacitor, characterized in that the anode is a sintered body using, as a raw material of the body, the niobium alloy powder according to claim 6.

8. A solid electrolytic capacitor characterized in that the solid electrolytic capacitor is made by incorporating a sintered body, as an anode in the interior of the capacitor, wherein the sintered body is made from the niobium alloy powder according to claim 6.

9. An anode for use in a solid electrolytic capacitor, characterized in that the anode is a sintered body using, as a raw material of the body, the niobium alloy powder according to claim 1.

10. A solid electrolytic capacitor characterized in that the solid electrolytic capacitor is made by incorporating a sintered body, as an anode in the interior of the capacitor, wherein the sintered body is made from the niobium alloy powder according to claim 1.

* * * * *